(12) United States Patent
Feldhaus

(10) Patent No.: US 7,931,108 B2
(45) Date of Patent: Apr. 26, 2011

(54) SEMI-TRAILER REPOSITIONER

(75) Inventor: Erich Hadden Feldhaus, Dallas, TX (US)

(73) Assignee: Erich Feldhaus, Dallas, TX (US)

( * ) Notice: Subject to any disclaimer, the term of this patent is extended or adjusted under 35 U.S.C. 154(b) by 141 days.

(21) Appl. No.: 12/491,595

(22) Filed: Jun. 25, 2009

(65) Prior Publication Data

US 2010/0032923 A1 Feb. 11, 2010

Related U.S. Application Data

(60) Provisional application No. 61/087,116, filed on Aug. 7, 2008.

(51) Int. Cl.
*B60S 9/14* (2006.01)
(52) U.S. Cl. .......................... 180/199; 180/11
(58) Field of Classification Search .................. 180/199, 180/11
See application file for complete search history.

(56) References Cited

U.S. PATENT DOCUMENTS

| | | | | |
|---|---|---|---|---|
| 2,374,320 | A | * | 4/1945 | Barnhart et al. ............. 280/431 |
| 3,120,398 | A | * | 2/1964 | Butterworth ................. 180/199 |
| 3,561,790 | A | | 2/1971 | Jurgens |
| 3,605,088 | A | | 9/1971 | Savelli |
| 3,734,538 | A | | 5/1973 | Humes |
| 3,779,328 | A | | 12/1973 | Wollenburg |
| 3,783,960 | A | | 1/1974 | Feliz |
| 3,880,440 | A | | 4/1975 | Tidewell |
| 4,208,063 | A | | 6/1980 | Baker et al. |
| 4,469,277 | A | | 9/1984 | Howes |
| 4,516,653 | A | * | 5/1985 | Walker ......................... 180/199 |
| 4,616,726 | A | * | 10/1986 | Johansson ..................... 180/419 |
| 4,653,771 | A | | 3/1987 | Gieg |
| 4,792,148 | A | | 12/1988 | Hintz |
| 4,860,841 | A | | 8/1989 | Sacco |
| 4,919,445 | A | | 4/1990 | Robey |
| 5,026,228 | A | | 6/1991 | Mansfield |
| 5,161,815 | A | | 11/1992 | Penor, Jr. |
| 5,244,226 | A | | 9/1993 | Bergh |
| 5,325,934 | A | | 7/1994 | Larson |
| 5,332,052 | A | | 7/1994 | Carnevale |
| 5,630,606 | A | | 5/1997 | Ryan |
| 6,292,094 | B1 | | 9/2001 | Deng et al. |
| 6,302,381 | B1 | | 10/2001 | Roll |
| 6,357,126 | B1 | | 3/2002 | Gillen, Jr. |
| 6,357,779 | B1 | | 3/2002 | Mok et al. |
| 6,384,716 | B1 | | 5/2002 | Eckelberry |
| 6,726,235 | B2 | | 4/2004 | McCarty |
| 7,427,183 | B2 | | 9/2008 | Stabeno |
| 2002/0100175 | A1 | | 8/2002 | King |
| 2004/0215374 | A1 | | 10/2004 | Shepard |
| 2007/0108731 | A1 | | 5/2007 | McBroom |
| 2007/0205579 | A1 | | 9/2007 | Plante |
| 2008/0217884 | A1 | | 9/2008 | Perri |

* cited by examiner

*Primary Examiner* — Kevin Hurley

(57) ABSTRACT

Exemplary apparatus and system for repositioning a semi-trailer are described. The repositoner may comprise two pivoting arms, each comprising a mechanical actuator attached to an underside area of the semi-trailer, wherein the pivoting arms are disposed substantially parallel to the underside of the semi-trailer in a first position and are configured to be pivoted away from the semi-trailer in a second position substantially perpendicular to the underside of the semi-trailer; two wheels mounted at an angle from a rear plane of the semi-trailer such that the semi-trailer moves in a circular path when the wheels turn, with each wheel operatively coupled to a motor; and a lower frame mounted to the mechanical actuators of the arms, the lower frame comprising two opposing wheel housing couple to the wheels; wherein, lowering the hydraulic jack arms can hydraulically lift the semi-trailer, and further wherein the wheels can maneuver the semi-trailer.

10 Claims, 5 Drawing Sheets

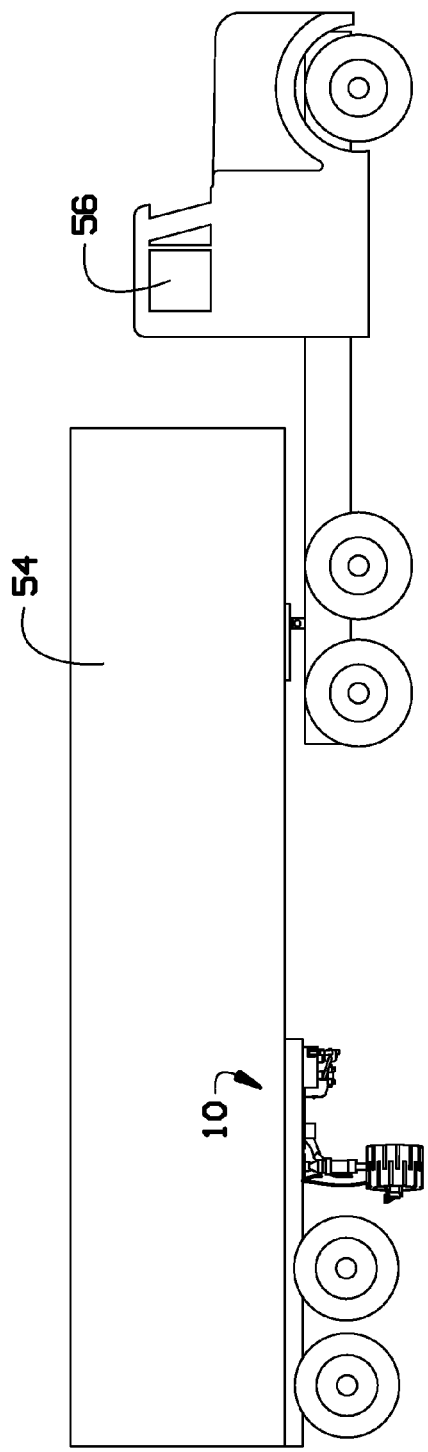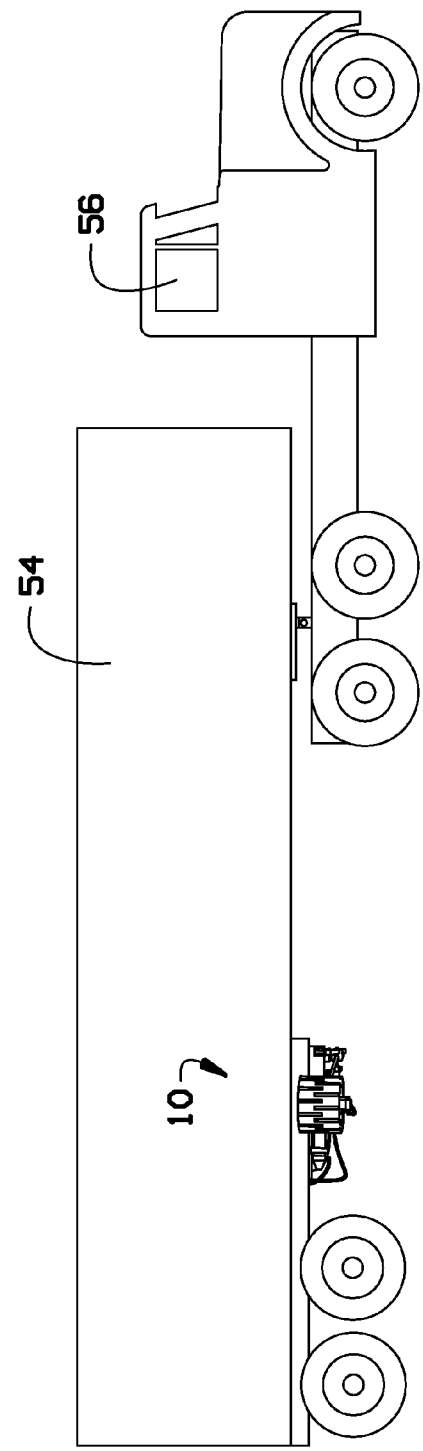

SEMI-TRAILER REPOSITIONER

RELATED APPLICATIONS

This application claims the benefit of priority from U.S. Provisional Patent Application No. 61/087,116, filed on Aug. 7, 2008, entitled "HTR 1000, Hydraulic Trailer Repositioner" which is incorporated by reference herein in its entirety.

BACKGROUND OF THE INVENTION

The present invention generally relates to the field of semi-trailer trucks, and more particularly, to a semi-trailer repositioner.

A semi-trailer truck, also known as tractor-trailer, is an articulated truck including a towing engine (tractor) and a one or more semi-trailers that carry the freight.

Crowded city streets and small warehouse dock space make it hard to back a long semi-trailer truck into position for unloading or loading. Also, a truck driver caught in traffic may be unable to make a turn due to the length of the trailer.

As can be seen, there is a need for an apparatus that facilitates repositioning of the truck to efficiently back into a dock or maneuver around a corner.

SUMMARY OF THE INVENTION

In one aspect of the present invention is provided, an apparatus for repositioning a semi-trailer, comprising: two hydraulic jack arms, each comprising a hydraulic cylinder containing a movable piston; an upper frame attached to an underside area of the semi-trailer, wherein the hydraulic jack arms are pivotally attached to the upper frame, further wherein the hydraulic jack arms are disposed substantially parallel to the upper frame and are disposed to be pivoted away from the upper frame to a position substantially perpendicular to the upper frame; two opposing wheels, each coupled to a wheel housing, wherein each wheel is operatively coupled to a motor; a lower frame with opposing ends, with each of the ends attached to one of the wheel housings, the lower frame being mounted to the movable pistons of the hydraulic jack arms; wherein, lowering the hydraulic jack arms can hydraulically lift the semi-trailer, and further wherein the wheels can maneuver the semi-trailer.

In another aspect of the present invention is provided, a system for repositioning a semi-trailer, comprising: two pivoting arms, each comprising a mechanical actuator attached to an underside area of the semi-trailer, wherein the pivoting arms are disposed substantially parallel to the underside of the semi-trailer in a first position and are configured to be pivoted away from the semi-trailer in a second position substantially perpendicular to the underside of the semi-trailer; two wheels mounted at an angle from a rear plane of the semi-trailer such that the semi-trailer moves in a circular path when the wheels turn, with each wheel operatively coupled to a motor; and a lower frame mounted to the mechanical actuators of the arms, the lower frame comprising two opposing wheel housing couple to the wheels; wherein, lowering the mechanical actuators can mechanically lift the semi-trailer, and further wherein the wheels can maneuver the semi-trailer.

These and other features, aspects and advantages of the present invention will become better understood with reference to the following drawings, description and claims.

BRIEF DESCRIPTION OF THE DRAWINGS

FIG. 3 shows a side view according to an embodiment of the present invention illustrating the extended position in use;

FIG. 4 shows a side view according to an embodiment of the present invention illustrating the retracted position in use;

DETAILED DESCRIPTION OF THE INVENTION

Figure 1:
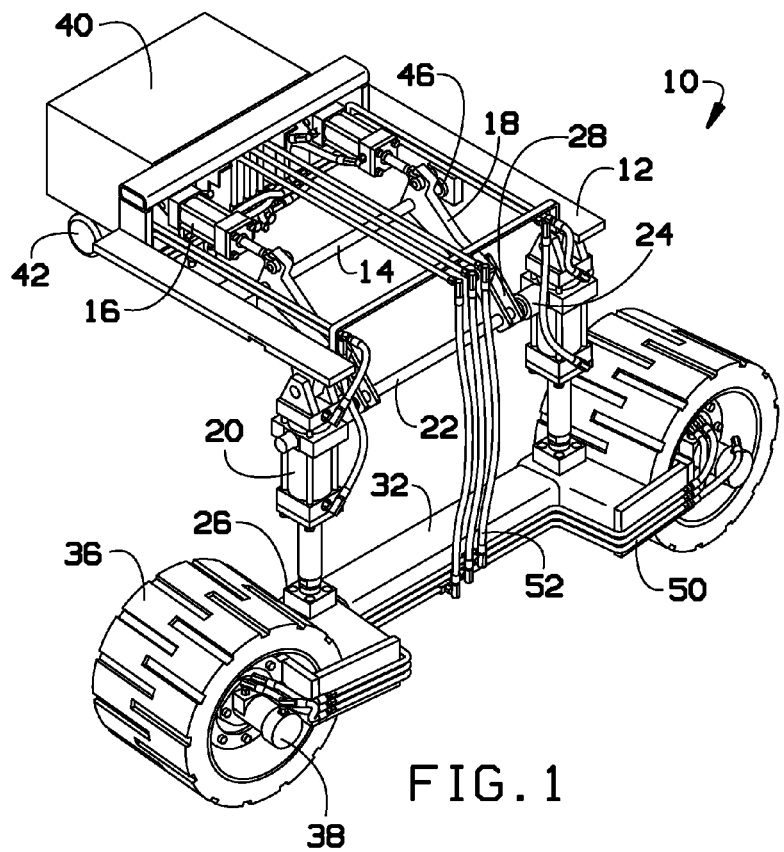
FIG. 1 shows a perspective view according to an embodiment of the present invention illustrating the extended position.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally include a semi-trailer repositioner for use in lifting and maneuvering a semi-trailer by way of lifting jacks located beneath the semi-trailer. The repositioner of the present invention may include a sturdy upper frame attached to an underside area of the semi-trailer by bolted connection or welded if permanent installation is required. All components of the present invention may be connected to a single upper frame for easy installation or removal.

When maneuvering the semi-trailer is needed, the two jack arms and wheels of the repositioner of the present invention may be lowered into position, wherein hydraulic pistons of the jack arms lift the load and back tires of the semi-trailer off the ground several inches. Moreover, motors mounted to the wheels of the present invention turn the wheels in either side-to-side directions required to move the semi-trailer into position for maneuvering. The present invention allows the side-to-side maneuvering of the semi-trailer, which is movement in a direction that is lateral with respect to the length of the semi-trailer. A driver only needs slightly more distance than the length of the truck and the semi-trailer in order to position the trailer for backing into place for loading and unloading. The present invention can pick up the back of the semi-trailer and move it to align with the tractor for docking. Also, the present invention can allow a driver of a truck that was jack-knifed to move the trailer, for example along an arc direction to a position so the driver can proceed.

In the present invention, the preferred means for mechanical actuation is by utilizing hydraulic systems and motors, however other means such as electrical and mechanical systems and motors, and a combination of them are also contemplated and suitable. By way of example, generally, hydraulic systems utilize hydraulic cylinders that get their power from pressurized hydraulic fluid from a reservoir, which is typically oil. The hydraulic cylinder may include a cylinder barrel, in which a piston connected to a piston rod moves back and forth. The barrel is closed on each end by the cylinder bottom (also called the cap end) and by the cylinder head where the piston rod comes out of the cylinder. The piston may include sliding rings and seals. The piston can divide the inside of the cylinder in two chambers, the bottom chamber (cap end) and the piston rod side chamber (rod end). The hydraulic pressure acts on the piston to do linear work and motion. Flanges, trunnions, and/or clevisses can be mounted to the cylinder body. The piston rod may also have mounting attachments to connect the cylinder to the object or machine component that it is pushing.

A hydraulic cylinder is the actuator side of this system. The generator side of the hydraulic system is the hydraulic pump which brings in a fixed or regulated flow of oil to the bottom side of the hydraulic cylinder, to move the piston rod upwards. The piston pushes the oil in the other chamber back to the reservoir. If it is assumed that the oil pressure in the piston rod chamber is approximately zero, the force on the piston rod equals the pressure in the cylinder times the piston area (F=PA). The piston moves instead downwards if oil is pumped into the piston rod side chamber and the oil from the piston area flows back to the reservoir without pressure. The pressure in the piston rod area chamber is (Pull Force)/(piston area−piston rod area).

Figure 2:
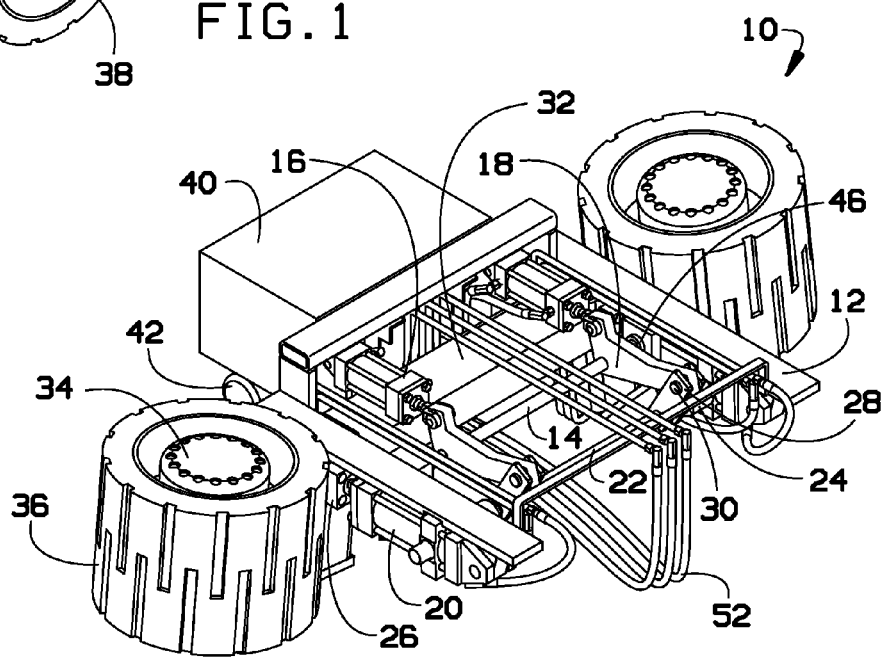
FIG. 2 shows a perspective view according to an embodiment of the present invention illustrating the retracted position.
Figure 5:
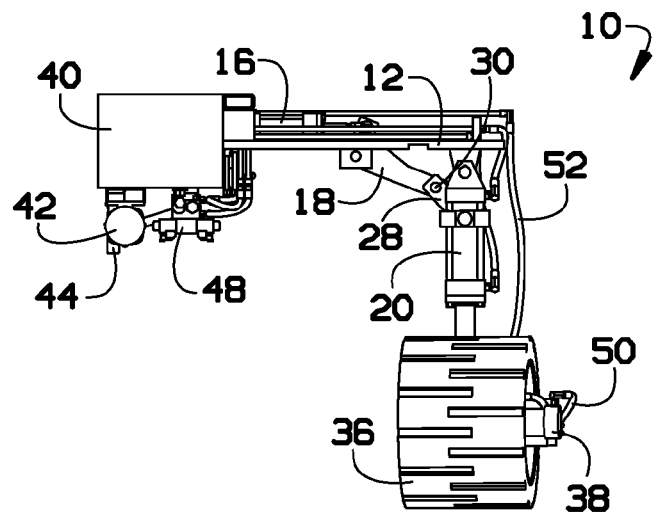
FIG. 5 shows a side view according to an embodiment of the present invention illustrating the extended position.
Figure 6:
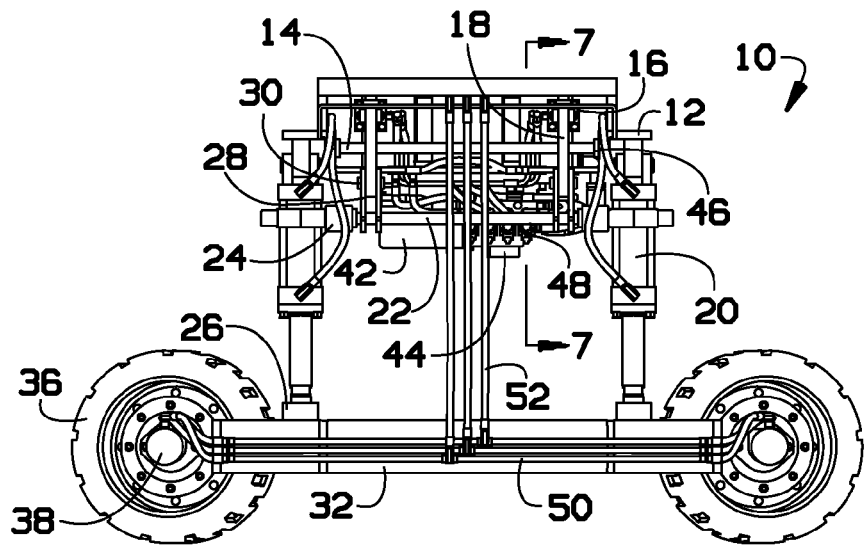
FIG. 6 shows a front view according to an embodiment of the present invention illustrating the extended position.
Figure 7:
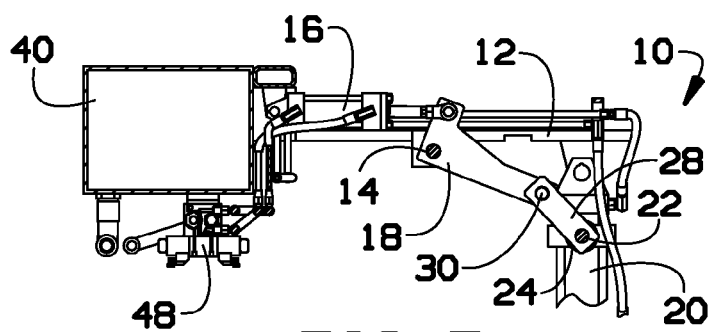
FIG. 7 shows a section view according to an embodiment of the present invention taken along line 7-7 in FIG. 6.
Figure 8:
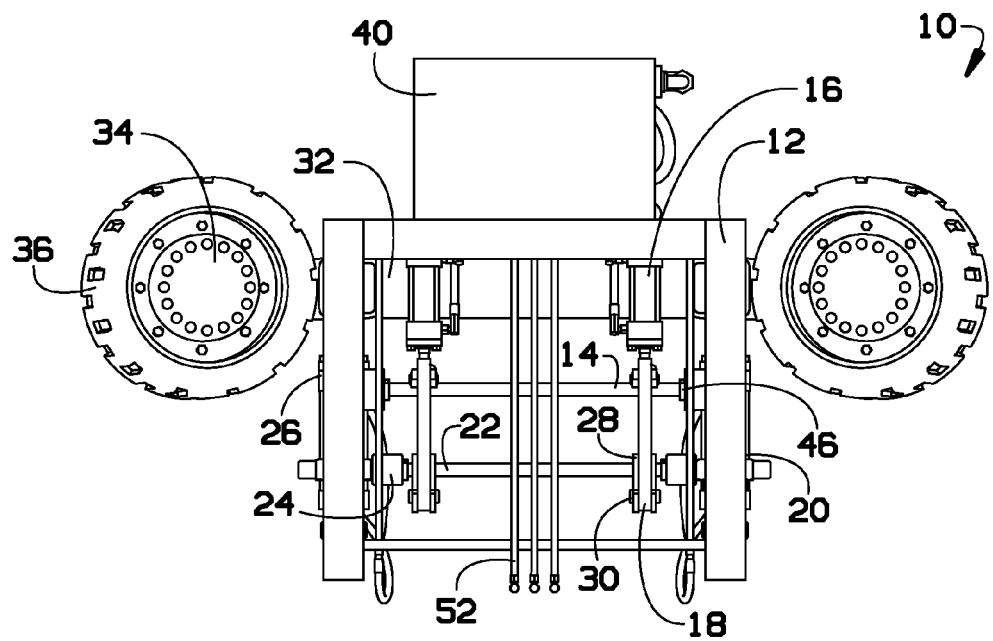
FIG. 8 shows a top view according to an embodiment of the present invention illustrating the retracted position.
Figure 9:
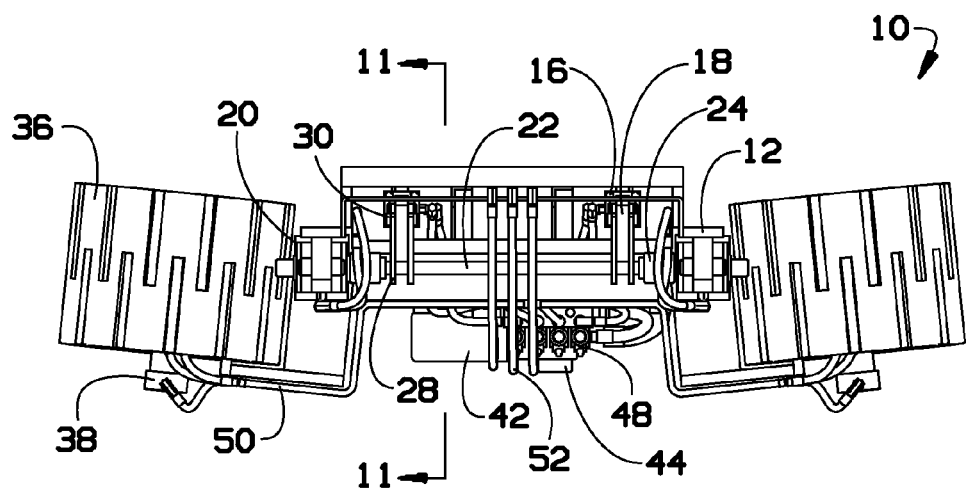
FIG. 9 shows a front view according to an embodiment of the present invention illustrating the retracted position.
Figure 10:
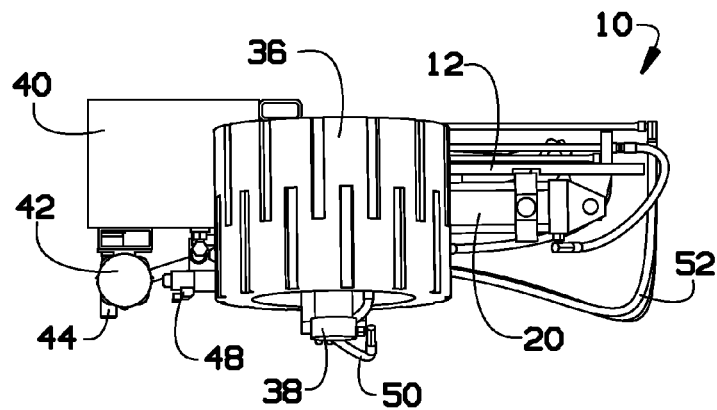
FIG. 10 shows a side view according to an embodiment of the present invention illustrating the retracted position.
Figure 11:
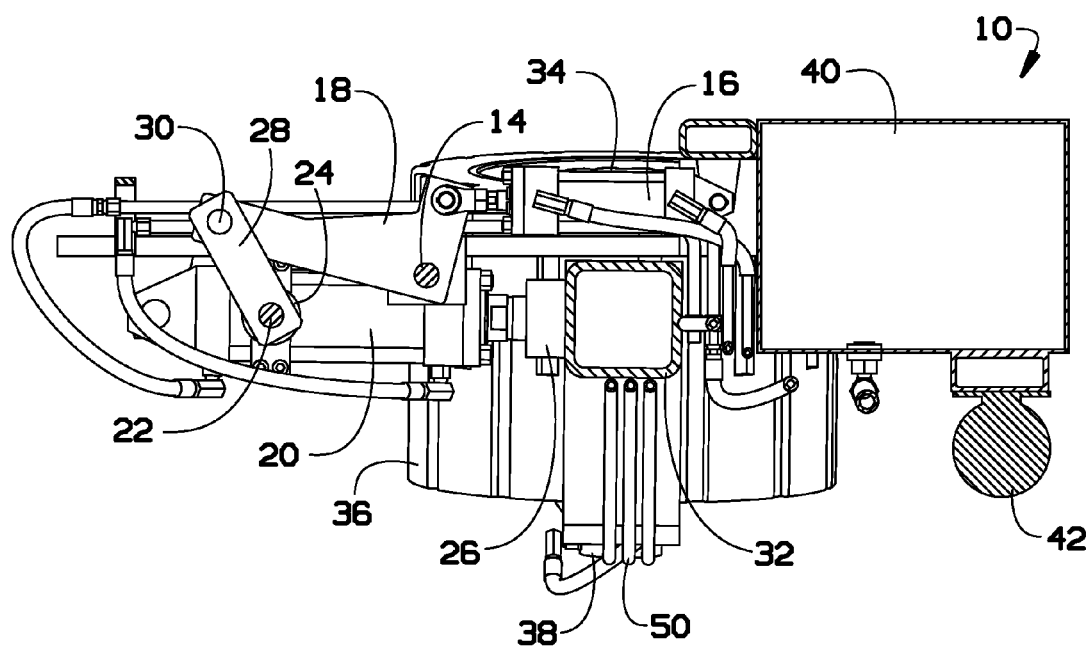
FIG. 11 shows a section view according to an embodiment of the present invention taken along line 11-11 in FIG. 9.

Referring now to FIGS. 1 through 11, a repositioner 10 for a tractor truck 56 having a semi-trailer 54 may include two hydraulic jack arms pivotally attached to the upper frame 12, the arms may each comprising a hydraulic cylinder 20 containing a movable piston. The hydraulic cylinder 20 is generally a mechanical actuator that includes a movable piston that is used to give a linear force through a linear stroke. One end of the piston is housed inside the cylinder, and the other end is exposed to the outside for providing the linear stroke.

The upper frame 12 can be attached to an underside area of the semi-trailer 54 at a location toward the end half of the semi-trailer 54 opposing the tractor truck 56, for example at or toward a middle area between the middle of the semi-trailer 54 and its end. The upper frame 12 may be made from any metal or alloy suitable for the purpose of withstanding the weight and pressure exerted from a load of 60 tons or more. The frame 12 may include any suitable configuration and support members for sturdy attachment to the bottom side of the semi-trailer 54. The upper frame 12 may by permanently attached to the underside of the semi-trailer 54, or it may be detachable from one semi-trailer 54 to another.

The pivoting system for the hydraulic jack arms may include two pivoting arms 18, each connected at one end to a hydraulic cylinder and piston assembly 16 for lowering the hydraulic arms. The pivoting arms 18, each may also be connected at the other end to a link 28 via a link pin 30. The two pivoting arms 18 may also be connected to one another by a shaft-arm pivot 14, and the two links 28 may be connected to one another by a shaft-link pivot 22 for support and unison of motion in operation. The shaft-link pivot 22 may also include at each of its end a coupler 24 for attachment to the cylinder 20 of the hydraulic arms. Also, the shaft-arm pivot 14 may also include at one or both of its end a collar-shaft 46. The hydraulic arms of the present invention can have a wide range of motion, for example the jack arms may be disposed substantially parallel to the upper frame 12 when in the retracted position, and are able to be pivoted away from the upper frame 12 to an extended position substantially perpendicular to the upper frame 12. For terrain that is not level or flat, for example is inclined or graded, the jack arms may be less than, or more than perpendicular to the upper frame 12. Included in the notion of the jack arms being substantially perpendicular to the upper frame 12, it is contemplated that on occasion, the Jack arms may be, for example, between about 1 degree and about 20 degrees more than or less than being exactly perpendicular to the upper frame 12.

One or more hydraulic cylinder and piston assemblies 16, for example two, may be used to swing the hydraulic jack arms down into place, and one hydraulic cylinder and piston assembly 20 per hydraulic jack arms may be used to extend the wheels 36 to the ground and lift the semi-trailer 54. Different size hydraulics can be used to accommodate different load requirements.

The repositioner 10 may also include a lower frame 32 mounted to the movable pistons of the hydraulic arms by way of a mount adaptor 26 for attaching the lower frame 32 to the exposed ends of the piston of the two hydraulic arms. The lower frame 32 may also include two opposing wheel housing, where each of the wheel housing includes a motor with parking brake 38. Each of the two wheels 36 may include a tire surrounding a wheel hub and gear drive 34. The tires may be air tires, tube tires, or solid tires, which are well suited for the present invention. The wheel housing may the attached to the wheel hub and gear drive 34 such that the tire may freely rotate around the wheel hub and gear drive 34. This means that the wheel hub and gear drive 34 may be fully or partially stationary at one or more locations, which one or more locations can be attached to the wheel housing and at the same time allowing the tire to freely rotate by the motor 38.

Propulsion for the wheels 36 can be achieved either by an electric motor, or more preferably a hydraulic motor 38 mounted at each wheel 36 for direct gear drive. The wheels 36 may be operatively coupled to the hydraulic motor and parking brake 38 by hydraulic tubing 50 and hydraulic hoses 52.

The wheels 36 may be mounted and positioned in-line, such that when both wheels 36 are turning, they tend to continue on a straight line that is in a lateral or side-to-side direction with respect the length of the semi-trailer 54. More preferably, the wheels 36 are mounted at an angle from rear plane of the semi-trailer 54 in order to provide for circular (arc) movement when the wheels 36 turn. For example, the range of angle for the wheels 36 may be between about 1 degree and about 30 degrees, preferably about 5 degrees and about 20 degrees, and more preferably about 15 degrees.

The wheels 36 can be lowered down, and by means of the jack arms, lift the back end of the semi-trailer 54, and hydraulic motors 38 turn the wheels 36 and move the semi-trailer 54 in either lateral direction. All of the components of the present invention can be controlled remotely from the cab of the truck or outside the tractor truck 56. The remote control system for the hydraulics may vary, for example a radio remote control system.

All of the hydraulic systems of the present invention may receive their power and propulsion by utilizing one or more hydraulic reservoirs 40 coupled to an electric motor 42, for example a 24 VDC motor, a hydraulic valve assembly 48, and a hydraulic pump 44 load sense with torque limit. The hydraulic power may be transferred to various hydraulic systems by way of separate hydraulic tubing 50 and hydraulic hoses 52. The present invention may receive its power supply from a power source that is the same as the power supply of the tractor truck 56 or the semi-trailer 54, for example the tractor truck engine or batteries, or the power supply may be a dedicated power supply or an auxiliary power system.

It should be understood, of course, that the foregoing relates to exemplary embodiments of the invention and that modifications may be made without departing from the spirit and scope of the invention as set forth in the following claims.

What is claimed is:

1. An apparatus for repositioning a semi-trailer, comprising:
- two hydraulic jack arms, each comprising a hydraulic cylinder containing a movable piston;
- an upper frame attached to an underside area of the semi-trailer, wherein the hydraulic jack arms are pivotally attached to the upper frame, further wherein the hydraulic jack arms are disposed substantially parallel to the upper frame and are disposed to be pivoted away from the upper frame to a position substantially perpendicular to the upper frame;
- two opposing wheels, each coupled to a wheel housing, wherein each wheel is operatively coupled to a motor;
- a lower frame with opposing ends, with each of the ends attached to one of the wheel housings, the lower frame being mounted to the movable pistons of the hydraulic jack arms;
- wherein, lowering the hydraulic jack arms can hydraulically lift the semi-trailer, and further wherein the wheels can maneuver the semi-trailer.

2. The apparatus of claim 1, wherein the two wheels are mounted at an angle that is fifteen degrees from a rear plane of the semi-trailer such that the semi-trailer moves in a circular path when the wheels turn.

3. The apparatus of claim 1, wherein the wheels comprise solid tires.

4. The apparatus of claim 1, further comprising a remote control system for controlling the hydraulic cylinders and motors.

5. The apparatus of claim 4, wherein the remote control system comprises a radio remote control system.

6. The apparatus of claim 1, further comprising an auxiliary power system dedicated the apparatus.

7. A system for repositioning a semi-trailer, comprising:
- two pivoting arms, each comprising a mechanical actuator attached to an underside area of the semi-trailer, wherein the pivoting arms are disposed substantially parallel to the underside of the semi-trailer in a first position and are configured to be pivoted away from the semi-trailer in a second position substantially perpendicular to the underside of the semi-trailer;
- two wheels mounted at an angle from a rear plane of the semi-trailer such that the semi-trailer moves in a circular path when the wheels turn, with each wheel operatively coupled to a motor; and
- a lower frame mounted to the mechanical actuators of the arms, the lower frame comprising two opposing wheel housing couple to the wheels;
- wherein, lowering the mechanical actuators can mechanically lift the semi-trailer, and further wherein the wheels can maneuver the semi-trailer.

8. The system of claim 7, wherein the two wheels are mounted at an angle that is pivoted fifteen degrees from the rear plane of the semi-trailer.

9. The system of claim 7, wherein the wheels comprise solid tires.

10. The system of claim 7, wherein the system for repositioning a semi-trailer is detachable from one semi-trailer to another.

* * * * *